(12) United States Patent
Donis et al.

(10) Patent No.: US 8,954,405 B2
(45) Date of Patent: Feb. 10, 2015

(54) CONTENT VALIDATION FOR DOCUMENTATION TOPICS USING PROVIDER INFORMATION

(71) Applicant: International Business Machines Corporation, Armonk, NY (US)

(72) Inventors: Paul S. Donis, Arnprior (CA); Glenn D. Rasmussen, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/776,381

(22) Filed: Feb. 25, 2013

(65) Prior Publication Data

US 2014/0244605 A1    Aug. 28, 2014

(51) Int. Cl.
*G06F 17/30*    (2006.01)

(52) U.S. Cl.
CPC .................. *G06F 17/30002* (2013.01)
USPC .......................................................... 707/694

(58) Field of Classification Search
USPC .......................................................... 707/694
See application file for complete search history.

(56) References Cited

U.S. PATENT DOCUMENTS

| | | | |
|---|---|---|---|
| 7,349,761 B1 * | 3/2008 | Cruse ............................ 700/276 |
| 7,590,640 B2 * | 9/2009 | Wolber et al. ........................ 1/1 |
| 7,620,888 B2 | 11/2009 | Hirst |
| 7,689,410 B2 * | 3/2010 | Chang et al. ....................... 704/9 |
| 7,716,228 B2 * | 5/2010 | Sahasrabudhe et al. ...... 707/748 |
| 8,135,685 B2 * | 3/2012 | Nair et al. ...................... 707/694 |
| 8,521,614 B1 * | 8/2013 | Yalamanchi et al. ........ 705/27.1 |
| 8,621,278 B2 * | 12/2013 | Petukhov et al. ............... 714/26 |
| 8,843,341 B2 * | 9/2014 | Rometsch ..................... 702/108 |
| 2005/0081189 A1 | 4/2005 | Krasikov et al. |
| 2009/0288072 A1 | 11/2009 | Kania |
| 2010/0146483 A1 | 6/2010 | Komarov et al. |
| 2010/0269100 A1 | 10/2010 | King et al. |
| 2011/0106810 A1 | 5/2011 | Huck et al. |
| 2012/0102458 A1 | 4/2012 | Meijer et al. |

OTHER PUBLICATIONS

Ademar Aguiar et al., "WikiWiki Weaving Heterogeneous Software Artifacts," WikiSym, Oct. 16-18, 2005, San Diego, CA (pp. 67-74) last printed from http://dl.acm.org/citation.cfm?id=1104980.

* cited by examiner

*Primary Examiner* — Cam-Linh Nguyen (74) *Attorney, Agent, or Firm* — Shumaker & Sieffert, P.A.

(57) ABSTRACT

At least one processor may determine one or more issues in one or more of a plurality of documentation topics that document at least one software functionality based at least upon applying one or more business rules to the one or more of the plurality of documentation topics. Responsive to determining the one or more issues, one or more entries may be inserted into an issues report, wherein the one or more entries include information regarding the one or more issues.

14 Claims, 5 Drawing Sheets

CONTENT VALIDATION FOR DOCUMENTATION TOPICS USING PROVIDER INFORMATION

TECHNICAL FIELD

The present disclosure relates to documentation validation, and more specifically relates to generating issue reports based on validating the content and metadata of documentation topics.

BACKGROUND

A web service interface to a particular product may be defined by an application model. The application model may include semantic constructs that semantically define the web service interface and may also include documentation topics that document the web service interface. A developer may define new semantic constructs for the web service interface and may provide initial documentation topics for the new semantic constructs. At a later time, an information developer (e.g., a technical writer) may provide client-facing documentation topics regarding the same new semantic constructs. As the developer defines new semantic constructs or revises previously-defined semantic constructs for the web service interface, existing documentation topics may be modified and new documentation topics may be added. Errors and inconsistencies in the documentation topics may be difficult to detect as semantic constructs are created and revised and as the documentation topics are created and revised.

SUMMARY

In one example, the disclosure is directed to a method for validating documentation for at least one software functionality. The method may include determining, by at least one processor, one or more issues in one or more of a plurality of documentation topics that document at least one software functionality based at least upon applying one or more business rules to the one or more of the plurality of documentation topics, including one or more of: applying the one or more business rules to metadata of the one or more of the plurality of documentation topics to cross-reference the metadata of the one or more of the plurality of documentation topics with a semantic model for the at least one software functionality, applying the one or more business rules to content of the one or more of the plurality of documentation topics to cross-reference the content of the one or more of the plurality of documentation topics with the semantic model for the at least one software functionality, and applying the one or more business rules to metadata of the one or more of the plurality of documentation topics and metadata of one or more related documentation topics to test consistency between the metadata of the one or more of the plurality of documentation topics with the metadata of the one or more related documentation topics. The method may further include responsive to determining the one or more issues, inserting, by the at least one processor, one or more entries into an issues report, wherein the one or more entries include information regarding the one or more issues In another example, the disclosure is directed to a system. The system may include at least one processor. The system may further include a memory. The system may further include a model processing module stored in the memory and operable by the at least one processor to: determine, by at least one processor, one or more issues in one or more of a plurality of documentation topics that document at least one software functionality based at least upon applying one or more business rules to the one or more of the plurality of documentation topics, including one or more of: apply the one or more business rules to metadata of the one or more of the plurality of documentation topics to cross-reference the metadata of the one or more of the plurality of documentation topics with a semantic model for the at least one software functionality, apply the one or more business rules to content of the one or more of the plurality of documentation topics to cross-reference the content of the one or more of the plurality of documentation topics with the semantic model for the at least one software functionality, and apply the one or more business rules to metadata of the one or more of the plurality of documentation topics and metadata of one or more related documentation topics to test consistency between the metadata of the one or more of the plurality of documentation topics with the metadata of the one or more related documentation topics; and responsive to determining the one or more issues, insert one or more entries into an issues report, wherein the one or more entries include information regarding the one or more issues.

In another example, the disclosure is directed to a computer-readable storage medium containing instructions. The instructions, when executed by at least one processor, may cause the at least one processor to perform operations. The operations may include determining, by the at least one processor, one or more issues in one or more of a plurality of documentation topics that document at least one software functionality based at least upon applying one or more business rules to the one or more of the plurality of documentation topics, including one or more of: applying the one or more business rules to metadata of the one or more of the plurality of documentation topics to cross-reference the metadata of the one or more of the plurality of documentation topics with a semantic model for the at least one software functionality, applying the one or more business rules to content of the one or more of the plurality of documentation topics to cross-reference the content of the one or more of the plurality of documentation topics with the semantic model for the at least one software functionality, and applying the one or more business rules to metadata of the one or more of the plurality of documentation topics and metadata of one or more related documentation topics to test consistency between the metadata of the one or more of the plurality of documentation topics with the metadata of the one or more related documentation topics. The operations may further include responsive to determining the one or more issues, inserting, by the at least one processor, one or more entries into an issues report, wherein the one or more entries include information regarding the one or more issues.

The details of one or more examples of the disclosure are set forth in the accompanying drawings and the description below. Other features, objects, and advantages of the disclosure will be apparent from the description and drawings, and from the claims.

DETAILED DESCRIPTION

In general, the disclosure is directed to validating documentation topics, such as documentation of software functionalities. For example, documentation of a web service interface can be validated by validating the content of and metadata associated with the documentation topics in the documentation with the corresponding semantic constructs for the web service interface, to determine any inconsistencies between the documentation topics and the corresponding semantic constructs or other related documentation topics. The techniques utilize information regarding providers of the documentation topics, in conjunction with information about consumers of the documentation topics, to apply specific business rules, thereby reducing the potential for error and missing content. Overall, this may contribute to a higher level of accuracy, completeness, and quality of documentation produced for all consumers.

A documentation topic may contain or otherwise be associated with metadata that provides certain information regarding the associated documentation topic. For example, the metadata may include information regarding the topic type, the topic ID, the topic provider, the topic consumer, and the modification date of the associated documentation topic. The semantic constructs modeling the web service interface may, in some examples, semantically define the methods provided by the web service interface to access a web service. For example, the semantic constructs may, for a method provided by the web service interface, semantically define the parameters of the method, the types accepted and returned by the method, and the like. A documentation topic that documents a specified function of the web service interface may correspond to a semantic construct that semantically defines that function of the web service interface. The metadata associated with the documentation topic may be compared to the corresponding semantic construct according to a set of business rules. For example, if the topic type for the documentation topic is set to obsolete in the metadata, the corresponding semantic construct may be checked to determine if the corresponding semantic construct is also set to obsolete. Conversely, if a semantic construct is set to obsolete, the metadata associated with the corresponding documentation topic may be checked to determine if the documentation topic is set to obsolete in the metadata. The metadata may also be compared to metadata in related documentation topics.

Metadata associated with a documentation topic may also be used to determine if the documentation topic is to be included in a generated documentation file. For example, if the generated documentation file is directed towards clients, but the metadata associated with a documentation topic specifies that the documentation topic is directed towards in-house developers, then that documentation topic may not be included in the generated documentation file.

By validating metadata associated with a documentation topic with a corresponding semantic construct, errors and inconsistencies in the documentation topics may be more quickly and accurately detected as the semantic model and the documentation topics are continually revised. Furthermore, by using the metadata associated with a documentation topic to determine whether to include the associated documentation topic, the documentation may be customized for different audiences.

Figure 1:
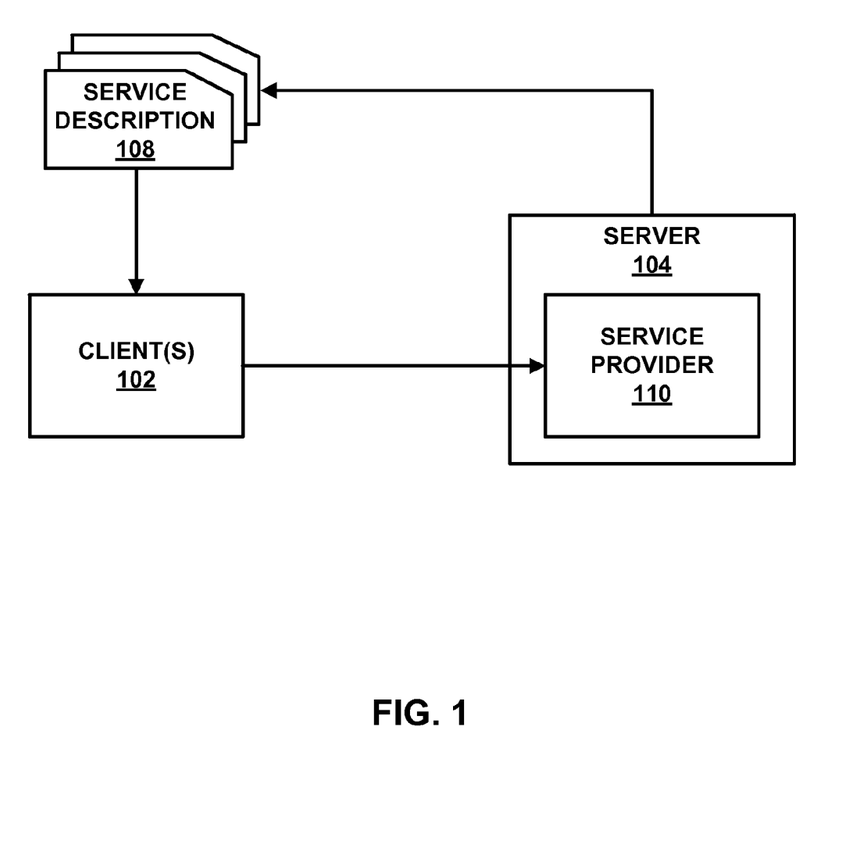
FIG. 1 is a block diagram illustrating an example server that provides services and an example client that accesses the provided services, according to some aspects of the present disclosure.

FIG. 1 is a block diagram illustrating an example server that provides services and an example client that accesses the provided services, according to some aspects of the present disclosure. As shown in FIG. 1, server 104 may include service provider 110 and service interface 106 for accessing the software functionality provided by service provider 110. In some examples, server 104 may be a web server, service provider 110 may be a web application, and service interface 106 may be a web service interface. Server 104 may produce service description 108 that describes the interface for accessing the software functionality of service provider 110. In some examples, if service provider 110 is a web application, then service description 108 may be written using Web Services Description Language (WSDL) to describe service provider 110's interface. One or more clients 102 may consume service description 108 to determine how to interact with service provider 110's interface to access the software functionality of service provider 110. For example, one or more clients 102 may generate and send calls to service provider 110's interface to enable service provider 110 to perform an operation based at least in part on the description provided by service description 108 of service provider 110's interface.

Figure 2:
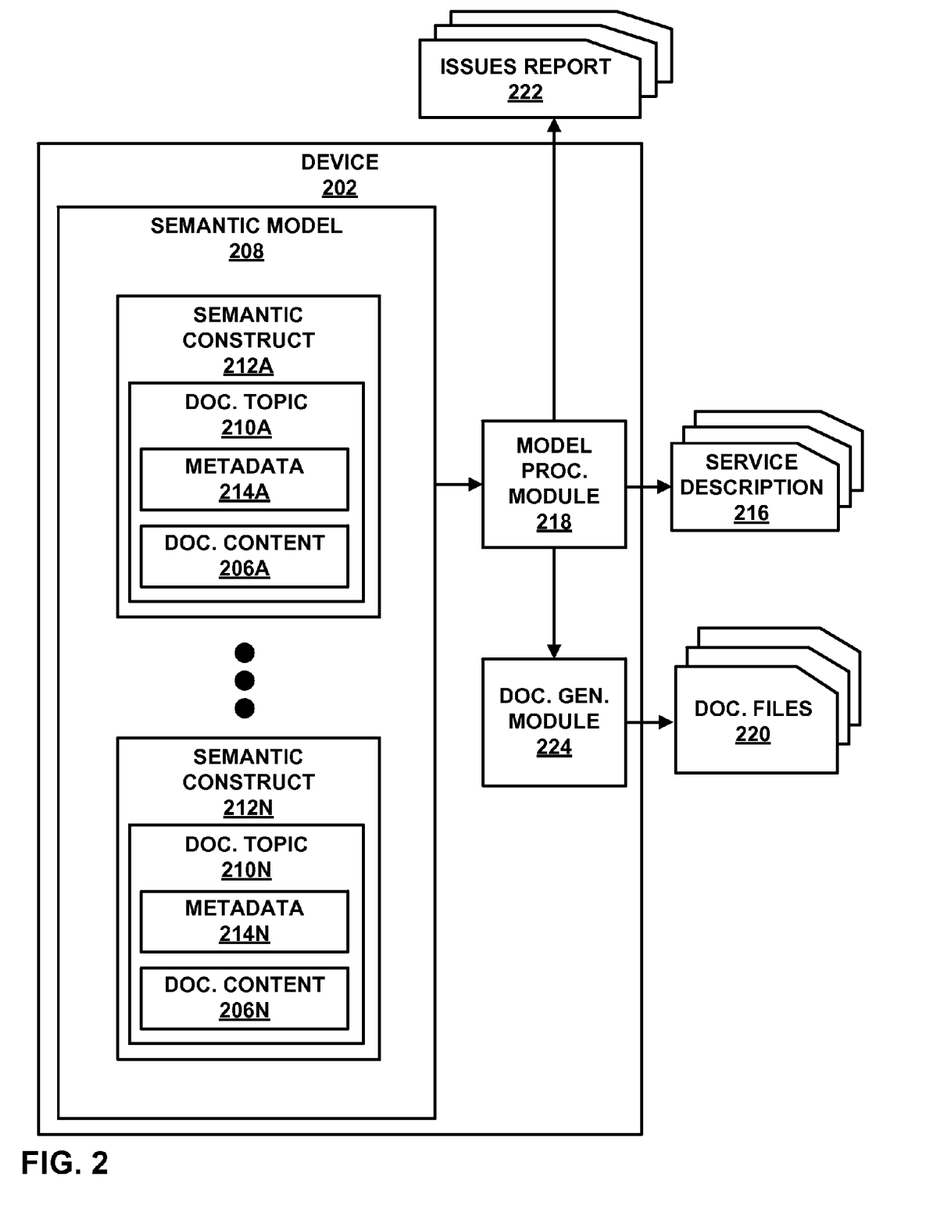
FIG. 2 is a block diagram illustrating an example device that produces service descriptions and documentation files according to some aspects of the present disclosure.

FIG. 2 is a block diagram illustrating an example device that produces service descriptions and documentation files according to some aspects of the present disclosure. Although FIG. 2 is described in terms of a web service interface, it should be understood that the example device shown in FIG. 2 is capable of producing service descriptions and documentation files for a variety of software functionalities apart from a web service interface. As shown in FIG. 2, device 202 may be a server or and other suitable computing device that may include model processing module 218 and document generation module 224. Model processing module 218 may process semantic model 208 to generate service description 216, issues report 222, and documentation that may be used by developers of the model and other internal consumers. Document generation module 224 may process a document generated by model processing module 218 to generate documentation files 220 that may be used by external users (e.g., developers of applications that uses the service description 216).

Semantic model 208 may define a web service interface and may include semantic constructs 212A-212N ("semantic constructs 212") that semantically model a web service interface. Semantic constructs 212 may include documentation topics 210A-210N ("documentation topics 210") that document the web service interface. For example, semantic construct 212A may include documentation topic 210A that documents the web service functionality defined by the associated semantic construct 212A. Documentation topics 212 may include respective documentation content 206A-206N ("documentation content 206") and metadata 214A-214N ("metadata 214"). Documentation topic 206 may be written text that explains one or more software functionality of the web service interface. Metadata 214 may describe documentation content 212 in documentation topic 210. In some examples, a documentation topic, such as documentation topic 210A, may conceptually be 'tagged' with metadata 214A.

Model processing module 218 may process semantic model 208 to produce service description 216, issues report 222, and internal documentation. Model processing module 218 may generate service description 216 based at least upon application model 208 that semantically models the web service interface. Service description 216 may be a machine-readable description of the web service interface and how those interfaces may be addressed and accessed by clients. In some examples, service description 216 may be a WSDL file that may be consumed by SOAP toolkits.

Model processing module 218 may also validate documentation topics 210 to detect issues such as common errors, omissions, and discrepancies between a documentation topic, such as documentation topic 210A, and the associated semantic construct that defines the software functionality documented by the associated documentation topic, such as semantic construct 212A that includes documentation topic 210A, by applying a set of business rules to metadata 214A associated with documentation topic 210A to determine any such issues. Such business rules may validate metadata 214A associated with documentation topic 210A with semantic construct 212A that describes the software functionality of the web service interface documented by documentation topic 210A to determine if documentation content 212 is semantically consistent with semantic construct 212A. Model processing module 218 may also compare documentation topic 210A against one or more related documentation topics. If any issues are found in the documentation topic 210A, model processing module 218 may create entries in issues report 222 that indicate such issues with documentation topic 210A.

Model processing module 218 may generate internal documentation files intended for model developers and other internal users based at least upon semantic model 208, documentation topics 210, metadata 214, and semantic constructs 212. Model processing module 224 may generate documentation files 220 intended for external users based on a document created by model processing module 218. Documentation files 220 may be human-readable description of the web service interface and how that interface may be addressed and accessed by clients. Examples of documentation files 220 may include tutorials, reference materials, change histories, release notes, and the like. In some examples, documentation files 220 may be organized into topics and sub-topics.

Figure 3:
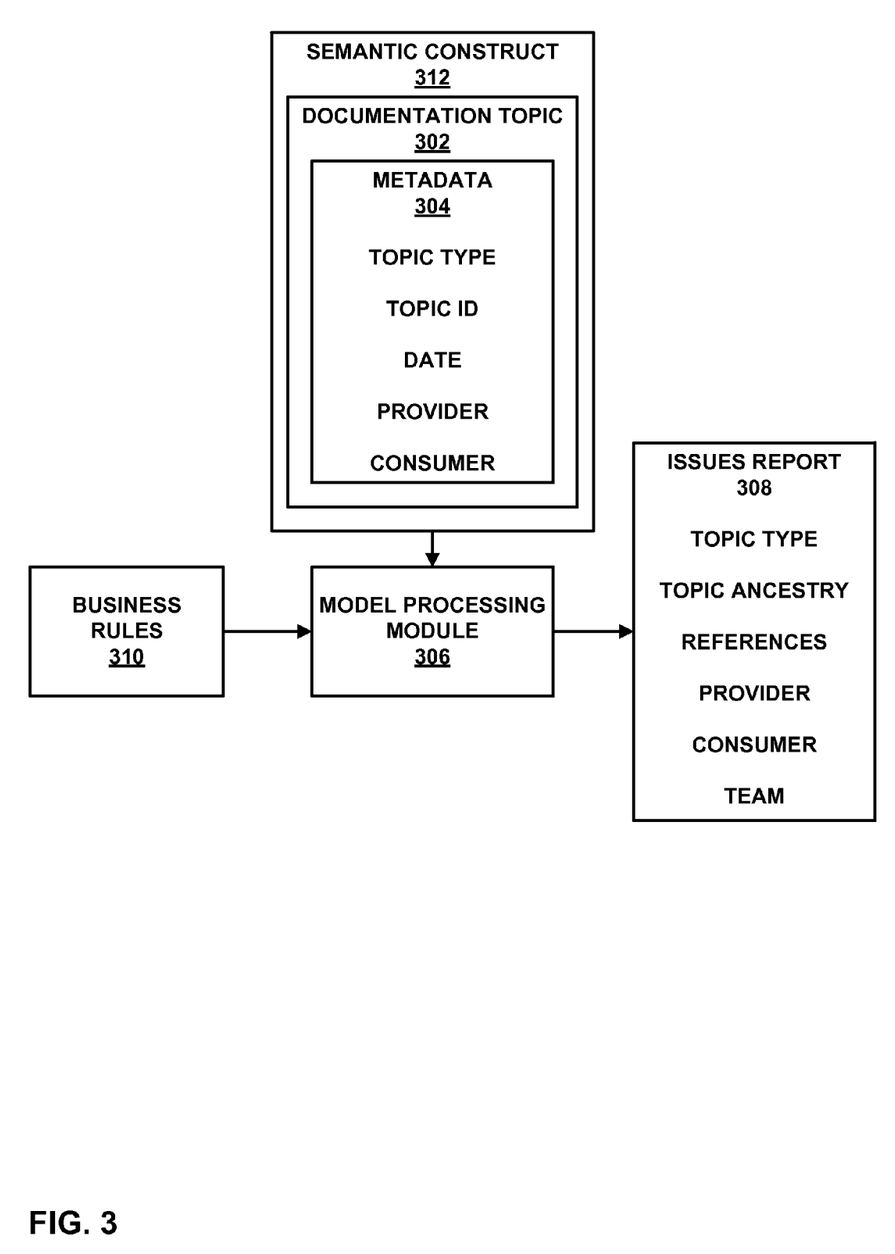
FIG. 3 is a block diagram illustrating an example system for validating and generating documentation for an example documentation topic according to some aspects of the present disclosure.

FIG. 3 is a block diagram illustrating an example system for validating and generating documentation files for an example documentation topic according to some aspects of the present disclosure. As shown in FIG. 3, model processing module 306, similar to model processing module 218 shown in FIG. 2, may validate documentation topic 302 and may add any issues found in documentation topic 302 to issues report 308, and may also create documentation based on the documentation topic.

Documentation topic 302 may include information regarding one or more interfaces or other software functionality offered by a web service. The interface and/or software functionality of the web service documented by documentation topic 302 may be semantically defined by a semantic model, so that the semantic model may include a tree of semantic constructs, such as semantic construct 312, that semantically define the interface and/or software functionality. Model processing module 306 may validate documentation topic 302 by applying business rules 310 to metadata 304 associated with documentation topic 302 to cross reference metadata 304 with semantic construct 312 to determine if documentation topic 302 is semantically consistent with semantic construct 312. By validating documentation topic 302 with semantic construct 312, model processing module 306 may determine if documentation topic 302 is consistent with the semantic definition of the same subject matter in semantic construct 312. Model processing module 306 may also compare the contents of documentation topic 302 against semantic construct 312, and may further compare documentation topic 302 against other related documentation topics.

Metadata 304 may include values that describe associated documentation topic 302. Metadata 304 for documentation topic 302 may include values for date, topic type, a topic ID, provider, and consumer. The date value in metadata 304 may indicate the date that documentation topic 302 was last modified. The topic type value in metadata 304 may indicate the type of information contained within documentation topic 302. In some examples, the topic type included in metadata 304 may include one of the Darwin Information Typing Architecture (DITA) types e.g., sample, topic, procedure, etc.). In some examples, the topic type may be a custom proto-topic that exists to streamline information development. For example, the topic type value may be an "obsolete notice" proto-topic. Custom proto-topics may be converted into standard topics using standard verbiage when model processing module 306 builds the documentation files based on documentation topic 302.

The topic ID value in metadata 304 may be used to refer to documentation topic 302 in another context, such as a "see also" list or an index. In some examples, topic IDs may be unique amongst all related documentation topics.

The provider value in metadata 304 may indicate the entity that provided the content for documentation topic 302. In some examples, valid provider values may include but are not limited to developer, writer, and generator. If the provider is a developer, then a model developer (e.g., a programmer for semantic construct 312) may be responsible for creating documentation topic 302. If the provider is a writer, then an information developer may be responsible for creating documentation topic 302. If the provider is a generator, then model processing module 306 may be responsible for creating documentation topic 302.

The provider value in metadata 304 may affect the creation of documentation files based on documentation topic 302. For example, if the provider value in metadata 304 is developer, then it may indicate that the contents of documentation topic 302 were provided by a developer of semantic construct 312. Therefore, the contents of documentation topic 302 may not be of sufficient quality to be published externally. Thus, such documentation topic 302 may have a related topic provided by a writer. As documentation in the semantic model is processed, such as by a document generation module, such as document generation module 224 shown in FIG. 2, to generate documentation files, the content in the documentation files may not be generated based on documentation topic 302. Instead, the related topic provided by a writer may be substituted for documentation topic 302 to generate content for the documentation files that are published externally to end users.

The consumers value in metadata 304 may include user roles that indicate documentation topic 302's intended audience. In some examples, valid consumer values may include but are not limited to developer, client, and administrator. If the consumer is denoted as a developer, then the intended audience for documentation topic 302 may be the in-house development staff. If the consumer is denoted as a client, then the intended audience for documentation topic 302 may be application end-users, business users, and/or consumers that have bought the product. If the consumer is denoted as administrator, then the intended audience for documentation topic may be clients with administrator capabilities and responsibilities.

Business rules 310 may include one or more tests that may be performed on metadata 304 in documentation topic 302 to determine if documentation topic 302 has one or more issues, including one or more errors, discrepancies, and the like. One or more of business rules 310 may include validating metadata 304 with semantic construct 312, such as by cross-referencing metadata 304 with semantic construct 312, to determine any discrepancies between documentation topic 302 and semantic construct 312 that model the interfaces documented by documentation topic 302, or other related documentation topics, or validate the content with the semantic constructs of the model.

The one or more business rules may include a business rule that tests consistency between a documentation topic in the plurality of documentation topics and a semantic construct in the semantic model that is associated with the documentation topic. The one or more business rules may include a business rule that tests consistency across other related documentation topics in the plurality of business topics. The documentation topic and its related documentation topics may be associated with the same semantic construct. The one or more business rules may include a business rule that tests content of a documentation topic in the plurality of documentation topics based on the semantic constructs in the semantic model.

Business rules 310 may test the metadata of documentation topic 302. For example, business rules 310 may include a business rule that tests if documentation topic 302 is missing its topic ID in associated metadata 304. If documentation topic 302 is missing its topic ID, then it may not be referenced by other documentation topics. Further, any sub-topics included in documentation topic 302 may also not be referenced by other documentation topics. In some examples, a missing topic ID may be considered a low-severity issue that is ignored and not reported in issues report 308.

Business rules 310 may also include a business rule that tests, for each piece of content in document topic 302 that is currently under review, if the content has a date value in associated metadata 304 that is less recent than every review comment date. If the content that is currently under review has a date value that is more recent than every review comment date, then an entry may be created documenting this issue in issues report 308. The entry into issues report 308 indicating that this rule was broken by documentation topic 302 may include an indication of which role should be responsible for examining the content.

Business rules 310 may also include a business rule that tests for any invalid reference elements in the documentation content of documentation topic 302 (not shown). A reference may be invalid if it is improperly formed, if the referenced semantic construct is deleted or relocated, or if there are multiple semantic constructs with the same name in the same container of documentation topic 302. If invalid reference elements are found in documentation topic 302, then an entry may be created documenting this issue in issues report 308 entry.

Business rules 310 may also test consistency across related documentation topics. Documentation topics may be related if they are associated with the same semantic construct 312. For example, business rules 310 may include a business rule that tests if documentation topic 302 is provided by a model developer (i.e., by checking the provider value in contained metadata 304). If documentation topic 302 is provided by a model developer then the business rule may test that a related topic provided by an information developer (e.g., technical writer) exists with the same consumers. As discussed above, if a documentation topic is provided by a model developer, then that documentation topic may be replaced with a related documentation topic provided by an information developer if the documentation topic is published. If documentation topic 302 is provided by a model developer but a related topic provided by an information developer does not exist with the same documentation consumers, then an entry may be created documenting this discrepancy in issues report 308 to indicate that an information developer should create a related topic.

Similarly, business rule 310 may also include a business rule that tests if documentation topic 302 is provided by an information developer. If documentation topic 302 is provided by an information developer, the business rule may test if documentation topic 302 has a more recent date than its related documentation topics provided by a model developer. If documentation topic 302 is provided by an information developer but one of its related documentation topics provided by a model developer has a more recent date, then an entry may be created documenting this discrepancy in issues report 308, indicating that an information developer may need to determine whether the updated content provided by the model developer should also be made available to non-development audiences.

Business rules 310 may include a business rule that tests consistency between documentation topic 302 and semantic construct 312 that is associated with the documentation topic. For example, business rules 310 may include a business rule that validates documentation topic 302 with semantic construct 312 to test that at least one documentation topic 302 that is associated with a deprecated semantic construct in semantic construct 312 is a deprecated proto-topic. Conversely, business rule 310 may also include a business rule that validates documentation topic 302 with semantic construct 312 to test whether semantic construct 312 is depreciated if documentation topic 302 associated with semantic construct 312 is a deprecated proto-topic topic.

Business rules 310 may also include a business rule that validates documentation topic 302 with semantic construct 312 to test that at least one documentation topic 302 that is associated with an obsolete semantic construct 312 is an obsolete proto-topic. Conversely, business rule 310 may also include a business rule that validates documentation topic 302 with semantic construct 312 to test whether semantic model 312 is obsolete if documentation topic 302 associated with semantic construct 312 is an obsolete proto-topic by determining if metadata 304 associated with documentation topic 302 includes an indication that documentation topic 302 is an obsolete proto-topic.

Business rules 310 may also include a business rule that creates an entry in issues report 308 that reports any topics that are reserved (e.g., reserved for future use).

If model processing module 306 determines that there is an issue in documentation topic 302 based on applying business rules 310 to associated metadata 304 and/or documentation content, model processing value 306 may insert an entry in issues report 308 documenting the issue. An entry in issues report 308 documenting an issue in documentation topic 302 may include documentation topic 302's topic type, topic ID, topic provider, topic consumer, references to related work orders, and an indication of the team that is most likely to be able to resolve the issue. Model developers and information developers may view issues report 308 to determine issues between documentation topic 302 and semantic model 312, and may be tasked with resolving such discrepancies.

Figure 4:
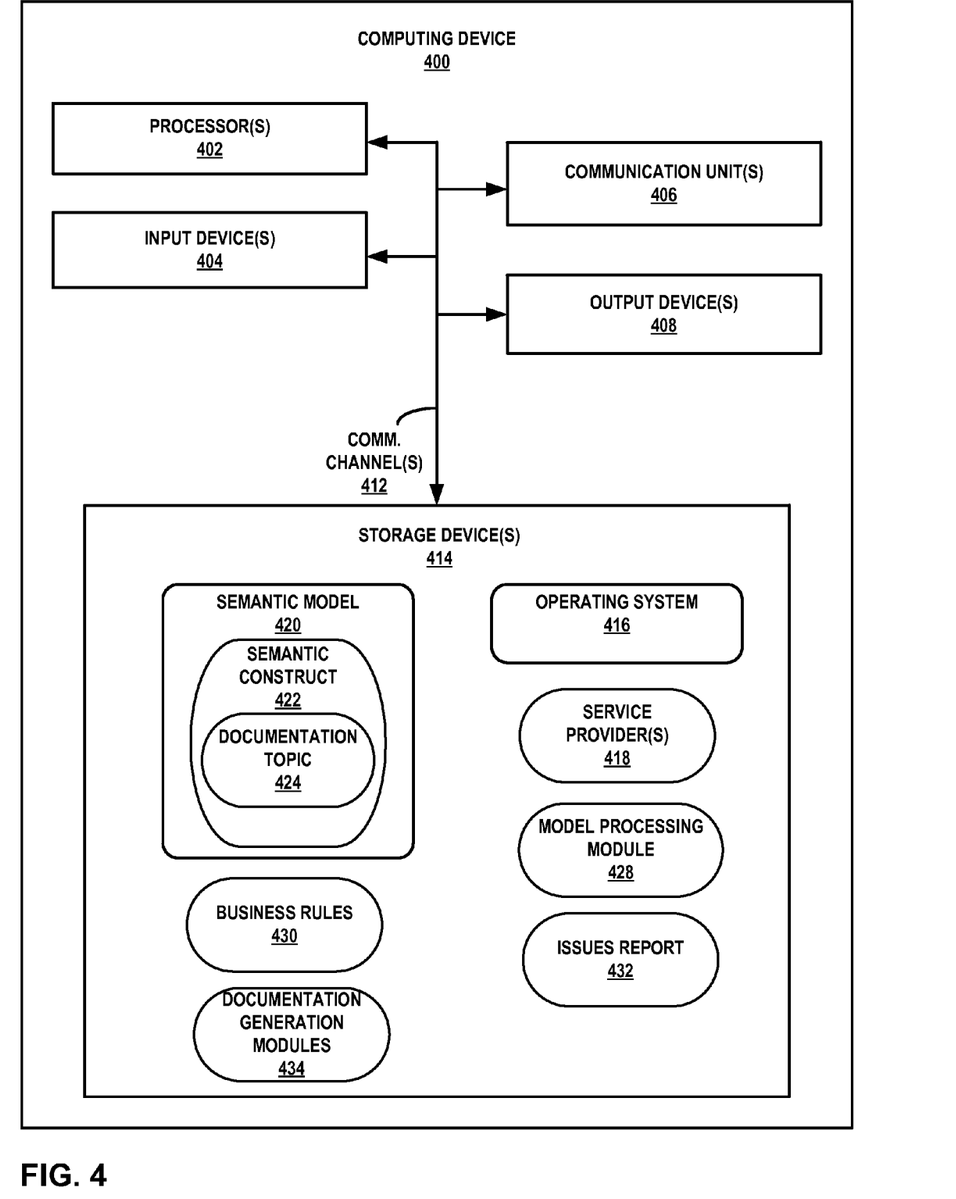
FIG. 4 is a block diagram illustrating an example computing device according to some aspects of the present disclosure.

FIG. 4 is a block diagram illustrating an example computing device according to some aspects of the present disclosure. As shown in the example of FIG. 4, computing device 400, similar to server 104 shown in FIG. 1 and server 202 shown in FIG. 2, may include one or more processors 402, one or more input devices 404, one or more communication units 406, one or more output devices 408, and one or more storage devices 414. In this example, storage devices 414 of computing device 400 may include operating system 416, service providers 418, semantic model 420, semantic construct 422, documentation topic 424, model processing module 428, business rules 430, issues report 432, and documentation generation modules 434. Communication channels 412 may interconnect each of the components 402, 404, 406, 408, and 414 for inter-component communications (physically, communicatively, and/or operatively). In some examples, communication channels 412 may include a system bus, a network connection, an inter-process communication data structure, or any other method for communicating data.

One or more input devices 404 of computing device 400 may receive input. Examples of input are tactile, audio, and video input. Input devices 404 of computing device 400, in one example, includes a presence-sensitive display, touch-sensitive screen, mouse, keyboard, voice responsive system, video camera, microphone or any other type of device for detecting input from a human or machine.

One or more output devices 408 of computing device 400 may generate output. Examples of output are tactile, audio, and video output. Output devices 408 of computing device 400, in one example, includes a presence-sensitive display, sound card, video graphics adapter card, speaker, cathode ray tube (CRT) monitor, liquid crystal display (LCD), or any other type of device for generating output to a human or machine.

One or more communication units 406 of computing device 400 may communicate with wired or wireless external devices via one or more networks by transmitting and/or receiving network signals on the one or more networks. For example, computing device 400 may use communication unit 406 to transmit and/or receive radio signals on a radio network such as a cellular radio network. Likewise, communication units 406 may transmit and/or receive satellite signals on a satellite network such as a GPS network. Examples of communication unit 406 include a network interface card (e.g. an Ethernet card), an optical transceiver, a radio frequency transceiver, a GPS receiver, or any other type of device that can send and/or receive information. Other examples of communication units 406 may include Bluetooth®, GPS, 3G, 4G, and Wi-Fi® radios found in mobile devices as well as Universal Serial Bus (USB) controllers.

One or more storage devices 414 within computing device 400 may store information required for use during operation of computing device 400. Storage devices 414, in some examples, have the primary purpose of being short term and not long-term computer-readable storage mediums. Storage devices 414 on computing device 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 414 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 414 may store program instructions and/or data associated with service providers 418, semantic model 420, semantic construct 422, documentation topic 424, model processing module 428, business rules, issues report 432, and/or document generation modules 434.

One or more processors 402 may implement functionality and/or execute instructions within computing device 400. For example, processors 402 on computing device 400 may read and execute instructions stored by storage devices 414 that execute the functionality of one or more service providers 418 and model processing module 428. These instructions executed by processors 402 may cause computing device 400 to store information within storage devices 414 during program execution. Processors 402 may execute one or more service providers 418, model processing module 428, and document generation modules 434 to perform various actions.

Similar to service provider 110 shown in FIG. 1, one or more service providers 418 may include one or more applications, such as one or more web applications, that provide one or more software functionality and services. One or more service providers 418 may include one or more interfaces, such as web interfaces, for accessing the software functionality and services provided by one or more service providers 418. For example, one or more service providers 418's interface may provide an API that includes a set of methods that may be called by an external client (not shown) via communication units 406 to access a software functionality provided by one or more service providers 418.

Semantic model 422 may semantically define the interface of one or more service providers 418. Semantic model 422 may be a tree of semantic constructs, including semantic construct 422 that defines at least a portion of a web interface for accessing service provider 418. Semantic construct 422 may include documentation topic 424 that document semantic construct 422. Documentation topic 424 may also indicate how semantic construct 422 is related to other semantic constructs in semantic model 420.

Model processing module 428, similar to model processing module 218 shown in FIG. 2 and model processing module 306 shown in FIG. 3, may process application model 420 to generate a service description, such as service description 108 shown in FIG. 1 and service description 216 shown in FIG. 2, that includes a machine-readable description of the interface of one or more service providers 418. Model processing module 428 may process semantic model 422 to generate the service description.

Model processing module 428 may also validate documentation topics, including documentation topic 424, by applying business rules 430, similar to business rules 310 shown in FIG. 3, that cross-reference the documentation topics with semantic model 422 and/or related documentation topics, and may report any issues detected in the documentation topics by inserting entries in issues report 432, similar to issues report 308 shown in FIG. 3.

Document generation modules 434 may process documents generated by model processing module 428 to generate documentation files for external consumption that document the interface of one or more service providers 418. Document generation modules 434 may include one or more modules that determine whether to include a documentation topic in the generated documentation files based on its metadata. For example, the provider value in the metadata of a documentation topic may affect document generation modules 434's creation of documentation files based on the documentation topic. If the provider value in the metadata is developer, then it may indicate that the contents of the documentation topic were provided by a developer of semantic model 420 for consumption by other in-house developers of semantic model 420. Therefore, the contents of the documentation topic may not be of sufficient quality to be published in the documentation files. Thus, such documentation topic may have a related topic provided by a writer. As document generation modules 434 process documentation in the application model to generate documentation files, document generation modules 434 may not generate any content in the documentation files based on the documentation topic. Instead, the related topic provided by a writer may be substituted for the documentation topic to generate content for the documentation files.

Furthermore, the consumers value in the metadata may affect the creation of documentation files based on the documentation topic, so that topics that are not intended for the audience of the documentation files may be removed. For example, if the consumers value in the metadata is developer (e.g., in-house development staff), then the documentation topic that includes the metadata may not be included in the documentation files because documentation intended for in-house developers may not be published externally.

Figure 5:
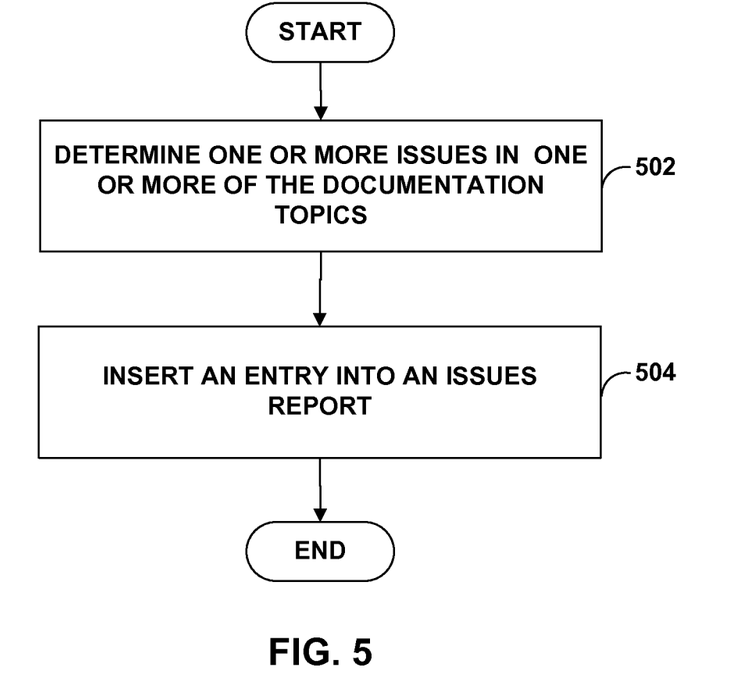
FIG. 5 is a flowchart illustrating an example process for validating a documentation topic according to some aspects of the present disclosure.

FIG. 5 is a flowchart illustrating an example process for validating a documentation topic according to some aspects of the present disclosure. The process may include determining, by at least one processor, one or more issues in one or more of a plurality of documentation topics that document at least one software functionality based at least upon applying one or more business rules to the one or more of the plurality of documentation topics, including one or more of: applying the one or more business rules to metadata of the one or more of the plurality of documentation topics to cross-reference the metadata of the one or more of the plurality of documentation topics with a semantic model for the at least one software functionality, applying the one or more business rules to content of the one or more of the plurality of documentation topics to cross-reference the content of the one or more of the plurality of documentation topics with the semantic model for the at least one software functionality, and applying the one or more business rules to metadata of the one or more of the plurality of documentation topics and metadata of one or more related documentation topics to test consistency between the metadata of the one or more of the plurality of documentation topics with the metadata of the one or more related documentation topics (502). The process may further include responsive to determining the one or more issues, inserting, by the at least one processor, one or more entries into an issue report, wherein the one or more entries include information regarding the one or more issues (504).

In some examples, applying the one or more business rules to metadata of the one or more of the plurality of documentation topics may include responsive to determining that a semantic construct associated with the one or more of the plurality of documentation topics in the semantic model for the at least one software functionality is obsolete, determining whether the one or more of the plurality of documentation topics is an obsolete proto-topic based at least in part on the metadata of the one or more of the plurality of documentation topics. In some examples, applying the one or more business rules to metadata of the one or more of the plurality of documentation topics may include responsive to determining that the one or more of the plurality of documentation topics is an obsolete proto-topic based at least in part on the metadata of the one or more of the plurality of documentation topics, determining whether a semantic construct associated with the one or more of the plurality of documentation topics in the semantic model for the at least one software functionality is obsolete.

In some examples, applying the one or more business rules to metadata of the one or more of the plurality of documentation topics may include responsive to determining that a semantic construct associated with the one or more of the plurality of documentation topics in the semantic model for the at least one software functionality is deprecated, determining whether the one or more of the plurality of documentation topics is a deprecated proto-topic. In some examples, applying the one or more business rules to metadata of the one or more of the plurality of documentation topics may include responsive to determining that the one or more of the plurality of documentation topics is a deprecated proto-topic based at least in part on the metadata of the one or more of the plurality of documentation topics, determining whether a semantic construct associated with the one or more of the plurality of documentation topics in the semantic model for the at least one software functionality is deprecated.

In some examples, applying the one or more business rules to metadata of the one or more of the plurality of documentation topics and metadata of one or more related documentation topics may include responsive to determining that the one or more of the plurality of documentation topics is provided by a model developer, determining whether the one or more related documentation topics is provided by an information developer. In some examples, applying the one or more business rules to content of the one or more of the plurality of documentation topics may include determining if the content of the one or more of the plurality of documentation topics include one or more invalid reference elements.

In some examples, the metadata of the one or more of the plurality of documentation topics may include one or more of: topic type, topic ID, topic provider, topic consumers, or date of last change. In some examples, the entry inserted into the issue report includes one or more of: topic type, topic ancestry, topic title, references to related work orders, topic provider, topic consumer, and team most likely to resolve the one or more issues. In some examples, the at least one software functionality may comprise an interface for a web service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various examples of the disclosure have been described. These and other examples are within the scope of the following claims.

The invention claimed is:

1. A system comprising:
   at least one processor;
   a memory;
   a model processing module stored in the memory and operable by the at least one processor to:
   determine, by at least one processor, one or more issues in one or more of a plurality of documentation topics that document at least one software functionality based at least upon applying one or more business rules to the one or more of the plurality of documentation topics, including one or more of:
     apply the one or more business rules to metadata of the one or more of the plurality of documentation topics to cross-reference the metadata of the one or more of the plurality of documentation topics with a semantic model for the at least one software functionality,
     apply the one or more business rules to content of the one or more of the plurality of documentation topics to cross-reference the content of the one or more of the plurality of documentation topics with the semantic model for the at least one software functionality, and
     apply the one or more business rules to metadata of the one or more of the plurality of documentation topics and metadata of one or more related documentation topics to test consistency between the metadata of the one or more of the plurality of documentation topics with the metadata of the one or more related documentation topics; and
   responsive to determining the one or more issues, insert one or more entries into an issues report, wherein the one or more entries include information regarding the one or more issues.

2. The system of claim 1, wherein apply the one or more business rules to metadata of the one or more of the plurality of documentation topics further comprises:
   responsive to determining that a semantic construct associated with the one or more of the plurality of documentation topics in the semantic model for the at least one software functionality is obsolete, determine whether the one or more of the plurality of documentation topics is an obsolete proto-topic based at least in part on the metadata of the one or more of the plurality of documentation topics.

3. The system of claim 1, wherein apply the one or more business rules to metadata of the one or more of the plurality of documentation topics further comprises:

responsive to determining that the one or more of the plurality of documentation topics is an obsolete proto-topic based at least in part on the metadata of the one or more of the plurality of documentation topics, determine whether a semantic construct associated with the one or more of the plurality of documentation topics in the semantic model for the at least one software functionality is obsolete.

4. The system of claim 1, wherein apply the one or more business rules to metadata of the one or more of the plurality of documentation topics further comprises:

responsive to determining that a semantic construct associated with the one or more of the plurality of documentation topics in the semantic model for the at least one software functionality is deprecated, determine whether the one or more of the plurality of documentation topics is a deprecated proto-topic.

5. The system of claim 1, wherein apply the one or more business rules to metadata of the one or more of the plurality of documentation topics further comprises:

responsive to determining that the one or more of the plurality of documentation topics is a deprecated proto-topic based at least in part on the metadata of the one or more of the plurality of documentation topics, determine whether a semantic construct associated with the one or more of the plurality of documentation topics in the semantic model for the at least one software functionality is deprecated.

6. The system of claim 1, wherein apply the one or more business rules to metadata of the one or more of the plurality of documentation topics and metadata of one or more related documentation topics further comprises:

responsive to determining that the one or more of the plurality of documentation topics is provided by a model developer, determine whether the one or more related documentation topics is provided by an information developer.

7. The system of claim 1, wherein apply the one or more business rules to content of the one or more of the plurality of documentation topics further comprises:

determine if the content of the one or more of the plurality of documentation topics include one or more invalid reference elements.

8. The system of claim 1, wherein the metadata of the one or more of the plurality of documentation topics includes one or more of: topic type, topic ID, topic provider, topic consumers, or date of last change.

9. The system of claim 1, wherein the one or more entries inserted into the issues report include one or more of: topic type, topic ancestry, topic title, references to related work orders, topic provider, topic consumer, and team most likely to resolve the one or more issues.

10. The system of claim 1, wherein the at least one software functionality comprises an interface for a web service.

11. A computer readable storage medium containing instructions that, when executed by at least one processor, cause the at least one processor to perform operations comprising:

determining, by the at least one processor, one or more issues in one or more of a plurality of documentation topics that document at least one software functionality based at least upon applying one or more business rules to the one or more of the plurality of documentation topics, including one or more of:

applying the one or more business rules to metadata of the one or more of the plurality of documentation topics to cross-reference the metadata of the one or more of the plurality of documentation topics with a semantic model for the at least one software functionality,     applying the one or more business rules to content of the one or more of the plurality of documentation topics to cross-reference the content of the one or more of the plurality of documentation topics with the semantic model for the at least one software functionality, and     applying the one or more business rules to metadata of the one or more of the plurality of documentation topics and metadata of one or more related documentation topics to test consistency between the metadata of the one or more of the plurality of documentation topics with the metadata of the one or more related documentation topics; and     responsive to determining the one or more issues, inserting, by the at least one processor, one or more entries into an issues report, wherein the one or more entries include information regarding the one or more issues.

12. The computer readable storage medium of claim 11, wherein the metadata of the one or more of the plurality of documentation topics includes one or more of: topic type, topic ID, topic provider, topic consumers, or date of last change.

13. The computer readable storage medium of claim 11, wherein the one or more entries inserted into the issues report include one or more of: topic type, topic ancestry, topic title, references to related work orders, topic provider, topic consumer, and team most likely to resolve the one or more issues.

14. The computer readable storage medium of claim 11, wherein the at least one software functionality comprises an interface for a web service.

\* \* \* \* \*